United States Patent Office

3,433,782
Patented Mar. 18, 1969

3,433,782
SEPARATION AND RECOVERY OF OLIGONUCLEOTIDES
Thomas Harry Kreiser, Elkhart, Ind., assignor to Miles Laboratories, Inc., Elkhart, Ind., a corporation of Indiana
No Drawing. Filed Dec. 27, 1965, Ser. No. 516,742
U.S. Cl. 260—211.5      5 Claims
Int. Cl. C07d 51/50

This invention relates to a process for separating oligonucleotides of varying chain length. More particularly, it relates to an improvement in the selective elution of oligonucleotide mixture components from an anion-exchange material and to the recovery of the oligonucleotide components from the eluates.

Polynucleotides, such as polyadenylic acid, polyuridylic acid, polyinosinic acid and the like, are usually prepared in polymer chains of substantial length. It is frequently desired to have such materials available in shorter polymer chains for use in biochemical research. It is well known that the polynucleotides can be hydrolyzed and converted into shorter chain length oligonucleotides by the action of the enzyme pancreatic ribonuclease. Such hydrolysis action results in a mixture of oligonucleotides of varying chain lengths.

It is also known that these various oligonucleotide mixture components can be isolated into portions of separate chain lengths by adsorption of the mixture onto an ion-exchange material followed by selective elution of the individual mixture components. Anion-exchange cellulose materials have been found useful for this purpose. The oligonucleotides can be selectively eluted from the ion-exchange material by means of aqueous lithium chloride solutions of increasing concentration. The eluate fractions can then be lyophilized and the lithium chloride removed from the product by dissolving in methanol. The insoluble olignoucleotides are then recovered by separating the solid matter from the lithium chloride-methanol solution.

While the above described teaching is useful for small scale academic work, it is unsatisfactory for larger scale industrial applications. The concentrations of lithium chloride required are quite high and the lithium chloride is not completely removed from the oligonucleotide.

It is an object of the present invention to provide an improved process for the separation of oligonucleotides.

It is a further object to provide an improved process for the recovery of oligonucleotides.

In accordance with the present invention, a process is provided for the separation of a mixture of oligonucleotides which comprises contacting an aqueous mixture of oligonucleotides with an anion-exchange material to adsorb all the oligonucleotide components of said mixture and selectively eluting the individual oligonucleotide components from said anion-exchange material with a lithium perchlorate or sodium perchlorate solution. It is preferred that the above adsorption and selective elution steps be carried out at a pH from about 4.5 to about 5.5. The oligonucleotides are recovered from the eluates by lyophilizing the eluates and then treating the dried lyophilized material with acetone. The acetone dissolves the lithium perchlorate or sodium perchlorate. Such acetone solution can then be easily separated from the insoluble oligonucleotides. This novel process has several advantages over the prior art. The lithium perchlorate or sodium perchlorate provide sharp separation of the individual oligonucleotide fractions during the selective elution. The lithium perchlorate or sodium perchlorate are more soluble in acetone than is lithium chloride in methanol. There is thus a more complete removal of the eluting material from the desired oligonucleotides. The oligonucleotides are also less soluble in acetone than they are in methanol, enabling a higher recovery of oligonucleotides to be attained. In general, the concentrations of lithium perchlorate or sodium perchlorate in the eluting solutions (about 0.02 to 0.15 M) are also lower than the concentrations required for the prior art lithium chloride (about 0.25 to 0.4 M). These advantages collectively improve the overall separation and recovery process and enable the process to be more useful on an industrial scale.

The anion-exchange materials useful in the present invention are well known and are available commercially from several sources. The preferred material is ecteola-cellulose which is prepared by reacting an alkali-treated cellulose with a mixture of epichlorohydrin and triethanolamine. Another useful material is deae-cellulose wherein the material reacted with cellulose is 2-chlorotriethylamine hydrochloride. The preparation of these materials is described in more detail in J. Am. Chem. Soc. 78, 751–755 (1956). Other useful anion-exchange cellulose materials are teae-cellulose (reaction product of ethylbromide and deae-cellulose), aminoethyl cellulose, guanidoethyl-cellulose, polyethyleneimine-cellulose and paraaminobenzyl-cellulose.

Another anion-exchange material useful in the present invention employs as the substrate a polysaccharide dextran suitably cross-linked with epichlorohydrin to produce a hydrophilic solid gel characterized by a high degree of microporosity. This substrate can be treated in a manner similar to that described above for cellulose to prepare anion-exchange material. This substrate material is available under the tradename "Sephadex" and is marketed by Pharmacia Fine Chemicals, Inc., New York, N.Y. The diethylaminoethyl modified form of anion-exchange material is known as "deae-Sephadex," for example.

The invention is described in further detail in the following examples.

EXAMPLE 1

A 250 mg. quantity of polyadenylic acid was dissolved at room temperature (about 20°–25° C.) in a mixture of 80 ml. of water and 20 ml. of 0.1 M tris acetate buffer at pH 7.0. The tris acetate buffer was composed of the reaction product of tris(hydroxymethyl) aminomethane and acetic acid. To the resulting polyadenylic acid solution were then added 20 mg. of pancreatic ribonuclease, and the polyadenylic acid-enzyme reaction mixture was maintained at 37° C. for 90 min. to convert the long polyadenylic acid chain to shorter oligonucleotide chains. To the reaction product mixture were then added 15 ml. of 88 percent (weight/volume basis) aqueous phenol and the mixture shaken. The enzyme was precipitated at the interface when the two layers separated. The phenol layer and preciptiate were then separated and discarded. An additional 5 ml. of aqueous phenol was then added to the aqueous layer, mixed, separated and discarded. The aqueous layer was then washed with 10 ml. of ethyl ether to remove trace amounts of phenol and the ether layer was discarded. The aqueous layer was then poured into a column containing 380 ml. of Ecteola-cellulose anion-exchange material in the perchlorate form at a pH of 4.75.

The individual oligonucleotide components were then selectively eluted from the anion-exchange column in the following manner. Two identical sized reservoirs were positioned at identical horizontal levels above the column. A 3 liter quantity of 0.005 M acetic acid-lithium acetate buffer at pH 4.75 was placed in one reservoir. A 3 liter quantity of 0.15 M lithium perchlorate in 0.005 M acetic acid-lithium acetate buffer at pH 4.75 was placed in the other reservoir. The two reservoirs were connected together by a narrow tube and the first reservoir, which served as a mixing unit, in turn was connected to the top of the anion-exchange column. An air pressure of 10 cm. mercury was maintained above the above described solutions so as to aid in forcing the solution mixture through the column. The levels of the two liquids in the two reservoirs were maintained at the same position relative to each other as the reservoirs were emptied. In this manner, the lithium perchlorate concentration of the eluting solution, which was initially zero, increased linearly with the volume eluted to a final value of 0.15 M. The eluting solution flowed through the column at a rate of 25 ml./ 9 min.—22.5 sec./4.5 sq. cm. of column cross-sectional area. Elution fractions were collected in 25 ml. quantities. Fractions 52–59, 68–80, 85–99 and 110–126 were collected in separate pools. The individual pools were then frozen and lyophilized under vacuum.

The separate residues were individually placed in centrifuge bottles and mixed with 10 ml. of acetone to dissolve the lithium perchlorate. The mixtures were centrifuged, the acetone layer was discarded, 5 ml. of acetone was added, the mixture centrifuged again and the acetone layer was discarded. The residues were then vacuum dried. Samples of each of the residues were dissolved in water and analyzed by paper chromotography. The material in fractions 52–59 was a linear aligonucleotide adenylate dimer with 2′:3′-cyclic phosphate terminal groups. The materials in fractions 68–80, 85–99, and 110–126, respectively, were the linear trimer, tetramer and pentamer of oligonucleotide adenylate with 2′:3′-cyclic phosphate terminal groups. The separation and recovery of the oligonucleotide fractions according to the above described process were carried out in a more advantageous manner as compared to the prior art. The isolated fractions were not contaminated with the eluting salt and the yield of isolated fractions was improved.

EXAMPLE 2

A 250 mg. quantity of polyadenylic acid was hydrolyzed with pancreatic ribonuclease according to the process described in Example 1. The reaction product was then mixed with 0.9 ml. of 71 percent (weight/volume basis) aqueous perchloric acid to bring the pH to 1.1. This acid treatment converted the 2′:3′-cyclic phosphate terminal groups of the oligonucleotides to 2′(3′)-phosphate groups. After 3 hours at room temperature, potassium hydroxide was added to bring the pH to 8.0. The potassium perchlorate precipitate thus formed was then filtered off and the filtrate was extracted twice with 15 ml. and 5 ml., respectively, of 88 percent (weight/volume basis) aqueous phenol followed by extraction with 10 ml. of ethyl ether to remove phenol. The aqueous layer from the above extractions was then passed in an Ecteola-cellulose perchlorate column and eluted in the manner described in Example 1. Elution fractions were collected in 25 ml. quantities. Fractions 59–71, 81–94, 101–113, and 121–131 were collected in separate pools. These separate pools were lyophilized and processed with acetone according to the procedure of Example 1 and were analyzed to contain, respectively, the linear dimer, trimer, tetramer and pentamer of oligonucleotide adenylate with 2′(3′)-phosphate terminal groups.

EXAMPLE 3

A 250 mg. quantity of polyadenylic acid was treated with enzyme and phenol and washed according to the procedure of Example 1. The resulting aqueous solution was adjusted to pH 4.75 by addition of 1.0 M acetic acid and then passed into a column containing 360 ml. of Ecteola-cellulose anionic ion-exchange material in the perchlorate salt form at pH 4.75. A 3 liter quantity of 0.001 M sodium acetate at pH 4.75 and a 3 liter quantity of 0.15 M sodium perchlorate in 0.001 M sodium acetate at pH 4.75 were placed in reservoirs as in Example 1. The mixture outlet was then connected to the top of the Ecteola-cellulose perchlorate column and the elution solution was passed into the column in the manner described in Example 1. Elution fractions were collected in 25 ml. quantities. Fractions 54–62, 73–86, 94–112 and 132–148 were collected in separate pools. These pools were lyophilized and processed with acetone according to the procedure of Example 1 and analyzed to contain, respectively, the linear dimer, trimer, tetramer and pentamer of oligonucleotide adenylate with 2′:3′-cyclic phosphate terminal groups.

EXAMPLE 4

A 250 mg. quantity of polyadenylic acid was treated with enzyme, phenol, perchloric acid and potassium hydroxide, filtered and washed according to the procedure of Example 2 to break up the long polyadenylic acid chain into shorter chain portions and to convert the 2′:3′-cyclic phosphate terminal groups to 2′(3′)-phosphate groups. The aqueous solution was then treated with 10 ml. of 0.5 M buffer at pH 9.0. This buffer was composed of the product tris(hydroxymethyl)aminomethane and acetic acid. Also added to the aqueous layer were 1 ml. of 0.1 M magnesium chloride and 1 ml. of bacterial alkaline phosphatase. This enzyme will cause the dephosphorylation of the terminal phosphate groups of the oligonucleotides. After 54 min. another 0.5 ml. of the enzyme was added. The reaction was continued for 100 min. until no further phosphate groups were released, as determined by colorimetric analysis by the method of Fiske and Subbahow, J. Biol. Chem. 66, 375 (1925). The reaction was then stopped by extracting the enzyme from the resulting aqueous solution with 10 ml. chloroform. The chloroform extract was then discarded. The chloroform was then extracted from the aqueous layer with 10 ml. of ethyl ether. The ether extract was then discarded. The so-purified aqueous solution was then adjusted to pH 4.76 by addition of 1.0 M acetic acid and passed into an Ecteola-cellulose column in the perchlorate form. A 3 liter quantity of 0.15 M lithium perchlorate in 0.001 M lithium acetate at pH 4.75 and 3 liters of 0.001 M lithium acetate at pH 4.75 were used to elute the column according to the procedure of Example 1. Elution fractions were collected in 25 ml. quantities. Fractions 38–53, 64–76, 87–98 and 109–119 were collected in separate pools. These pools were lyophilized and processed with acetone according to the procedure of Example 1 and analyzed to contain, respectively, the linear dimer, trimer, tetramer and pentamer of the adenosine dephospho-oligonucleotides.

EXAMPLE 5

A 250 mg. quantity of polyuridylic acid was processed in a manner similar to that described in Example 4 to form an aqueous solution of a mixture of uridine dephospho-oligonucleotides. This solution was then passed into an Ecteola-cellulose perchlorate column and eluted with solutions of 4.5 liters of 0.001 M lithium acetate at pH 4.75 and 4.5 liters of 0.15 M lithium perchlorate in 0.001 M lithium acetate at pH 4.75 in a manner described in Example 4. Elution fractions were collected in 25 ml. quantities. Fractions 38–56, 80–93, 114–133, 155–185 and 220–255 were collected in separate pools. These pools were lyophilized and processed with acetone according to the procedure of Example 1 and analyzed to contain, respectively, the linear dimer, trimer, tetramer, pentamer and hexamer of the uridine dephospho-oligonucleotides.

EXAMPLE 6

A 250 mg. quantity of polyadenylic acid was processed with enzyme and phenol and washed in the manner of Example 1 to form a mixture of adenosine oligonucleotide chains. This aqueous mixture was adjusted to a pH of 3–4 by addition of acetic acid. Then 2 g. of sodium nitrite dissolved in 5 ml. of water were added. After 50 min. another 1 g. of sodium nitrite was added. After a total of 135 min. 1 g. of sodium nitrite was added. The reaction was continued for a total of 213 min. This deaminated the adenosine oligonucleotides to convert them to inosine oligonucleotides. The aqueous reaction product was then adjusted to pH 8–9 using 10 M sodium hydroxide. The oligonucleotides were precipitated out by adding 5 ml. of saturated zinc acetate solution. The precipitate was separated by centrifugation and then dissolved in 0.05 M ammonium acetate. This solution was then passed through an Ecteola-cellulose perchlorate column and eluted with 3 liters of water and 3 liters of 0.15 M lithium perchlorate in the manner described in Example 1. Fractions 52–57, 74–81, 95–106, and 125–140 were collected in separate pools. These pools were lyophilized and processed with acetone according to the procedure of Example 1 and analyzed to contain, respectively, the linear dimer, trimer, tetramer and pentamer of inosine oligonucleotides with 2':3'-cyclic phosphate terminal groups.

In summary, the present invention relates to the use of lithium perchlorate or sodium perchlorate to selectively elute adsorbed oligonucleotide fractions from an anion-exchange column and to recover such oligonucleotide fractions from the eluates by lyophilizing the eluates, dissolving the lithium perchlorate or sodium perchlorate with acetone and separating the insoluble oligonucleotides from the acetone solution.

What is claimed is:

1. A process for the separation of a mixture of oligonucleotides which comprises contacting an aqueous mixture of oligonucleotides with an anion-exchange material to adsorb all the oligonucleotide components of said mixture and selectively eluting the individual oligonucleotide components from said anion-exchange material with a lithium perchlorate or sodium perchlorate solution.

2. A process according to claim 1 wherein the anion-exchange material is an anion-exchange cellulose.

3. A process according to claim 1 wherein the anion-exchange material is Ecteola-cellulose.

4. A process according to claim 1 wherein the adsorption and selective elution are carried out at a pH from about 4.5 to about 5.5.

5. A process according to claim 1 wherein the oligonucleotide components are recovered from the lithium perchlorate or sodium perchlorate eluate by the further steps of lyophilizing the eluate, dissolving the lithium perchlorate or sodium perchlorate with acetone and separating the insoluble oligonucleotides from the acetone solution.

References Cited
UNITED STATES PATENTS 3,157,635 11/1964 Tanaka et al. _____ 260—211.5
3,324,110 6/1967 Nussbaum _____ 260—211.5

LEWIS GOTTS, *Primary Examiner.*

J. R. BROWN, *Assistant Examiner.*